(12) United States Patent
Swarnkar et al.

(10) Patent No.: US 7,849,345 B1
(45) Date of Patent: Dec. 7, 2010

(54) DDR CONTROL

(75) Inventors: Jitendra Kumar Swarnkar, San Jose, CA (US); Jie Du, Santa Clara, CA (US); Vincent Wong, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 637 days.

(21) Appl. No.: 11/925,605

(22) Filed: Oct. 26, 2007

Related U.S. Application Data

(60) Provisional application No. 60/863,061, filed on Oct. 26, 2006, provisional application No. 60/982,287, filed on Oct. 24, 2007.

(51) Int. Cl.
*G06F 13/14* (2006.01)
*G06F 15/78* (2006.01)

(52) U.S. Cl. .................. 713/401; 713/400; 711/105; 711/158; 365/230.04; 365/230.08; 365/233.13; 710/244

(58) Field of Classification Search ......... 713/400–401; 711/105, 158; 365/230.04, 230.08, 233.13; 710/244

See application file for complete search history.

(56) References Cited

U.S. PATENT DOCUMENTS

| | | | | |
|---|---|---|---|---|
| 7,302,532 B2 * | 11/2007 | Sandorfi | ............... | 711/153 |
| 7,464,231 B2 * | 12/2008 | Raad | ............... | 711/158 |
| 7,634,623 B2 * | 12/2009 | Raad | ............... | 711/158 |
| 2004/0160384 A1 * | 8/2004 | Jeffrey et al. | ............... | 345/3.2 |
| 2005/0050289 A1 * | 3/2005 | Raad | ............... | 711/167 |
| 2005/0097392 A1 * | 5/2005 | Sandorfi | ............... | 714/6 |
| 2007/0300096 A1 * | 12/2007 | Berry et al. | ............... | 713/400 |

* cited by examiner

*Primary Examiner*—Abdelmoniem Elamin

(57) ABSTRACT

A computer system for writing data to a memory is disclosed. The memory controller in the computer system comprises a system clock, which is generated by the memory controller. A first register captures the lower data word based on the rising edge of the system clock. A second register, coupled to the first register, captures the output of the first register based on the rising edge of the system clock. A third register, captures the upper data word based on the falling edge of the system clock. A forth register, coupled to the third register, captures the output of the third register based on the falling edge of the system clock. A first multiplexer is coupled to a forth register and a second register. A delay element, coupled to the system clock and a first multiplexer, adjusts the phase of the system clock. A second multiplexer, coupled to the system clock, generates a data strobe.

16 Claims, 6 Drawing Sheets

DDR CONTROL

RELATED APPLICATIONS

This application claims the benefit of priority to U.S. Provisional Application No. 60/863,061 filed Oct. 26, 2006, titled "Buffer Manager Design Specification," and U.S. Provisional Application No. 60/982,287, filed Oct. 24, 2007, titled, "DDR Controller," both of which are incorporated herein by reference in their entirety. This application is also related to a co-pending, co-assigned U.S. application Ser. No. 11/877,410, filed Oct. 23, 2007, titled "Buffer Manager System and Method," which is also herein incorporated by reference.

FIELD OF THE INVENTIONS

The present invention relates generally to external memory controllers and, more specifically, to Double Data Rate ("DDR") Synchronous Dynamic Random Access Memory ("SDRAM") memory controllers.

BACKGROUND OF THE INVENTION

Conventional personal computers and an increasing number of consumer electronic devices rely on a similar base hardware platform to perform signal processing. Typically, this base hardware platform includes a central processing unit ("CPU"), main system memory, input/output ("I/O") devices, and storage devices. Several interconnect channels, providing connectivity between the functional components, enable data, commands, and control signals to flow between each component. Main system memory provides the CPU access to its contents, which include data and programs, using a variety of standards-based I/O interconnect channels, or bus interfaces. Typically, the type of memory determines which standards-based I/O bus interface connects the CPU to the main system memory.

The I/O bus interface between the main system memory and the CPU defines the data transmission rules, or protocol, and the electrical signaling requirements of the communication channel between the two devices. Often, a controller manages the complex processing of commands, data, and signaling between the CPU and the main system memory. A controller can be implemented in a variety of ways, such as a stand-alone semiconductor device or a functional block, residing within the CPU, co-processor, or digital signal processor ("DSP"). A computer system with a CPU connected to main system memory, using an I/O bus, is one example of a host system.

System architects commonly use various types of synchronous random access memory ("SDRAM") as the main system memory. Single data rate ("SDR") SDRAM, one example of SDRAM, operates by sending and receiving data and commands to and from the controller only during the rising edge of a clock common to CPU and the SDR SDRAM device. Sending and receiving data once during a clock cycle is recognized by those skilled in the art as single data rate transmission.

DDR SDRAMs, on the other hand, support data transfers on both the rising and falling edges of a clock signal in a given clock cycle, theoretically doubling the memory chip's data throughput. DDR SDRAMs transmit data ("DQ") during both the rising and falling edges of a data strobe (or "DQS"), distinguished from transmitting data using only the rising edge of the system clock in SDR SDRAM applications. The data strobe is commonly a nonfree-running signal, generated by the device driving the data bus (the controller for write operations, the DRAM for read operations). In both read and write operations, the data strobe is derived from a clock provided by the memory controller. Using a separate data strobe enables DDR SDRAMs to operate at higher bandwidths compared to SDR SDRAMs.

Applications requiring high performance data processing often use DDR SDRAM as main system memory because of its performance, reliability, and cost savings. Nevertheless, as the performance of DDR SDRAM increased, the complexities associated with achieving the required timing relationship between controller and the DDR SDRAM have become increasingly difficult. The timing relationship between the controller and the DDR SDRAM depends on the uncertainty of the placement of the data relative to DQS during read and write operations.

The DDR SDRAM bus interface standard defines the timing relationship between data and DQS differently for read and write operations. For read operations, the DDR SDRAM presents the data and DQS signals to the controller edge aligned. Accordingly, the rising edge of the data occurs at relatively the same time as the rising edge of DQS at the input pins of the controller. The controller then delays the DQS relative to the data, aligning the rising edge of DQS with the center of the data signal to enable proper sampling. For a write cycle, the DDR SDRAM requires the DQS strobe to be centered with each data signal entering the memory device. Using this approach, the delay circuitry resides only in the controller and does not have to be reproduced in each DRAM device in a system.

Typically, a DDR SDRAM interface contains multiple data signals, operating as a parallel bus. Memory interface designers generally try to minimize the uncertainty of the placement of data relative to DQS by matching physical routing lengths of each data signal between the controller and the DDR SDRAM. As the width of a main system memory data bus increases, matching routing lengths becomes difficult and time consuming. Yet, any skew, jitter or uncertainty with regard to the placement of data in relation to DQS can reduce the memory throughput. Specifically during the write operation, significant skew results from the differences in routing length and other electrical parameters of the interface signal traces.

Skew may also result from the difference in phase between the clock domain associated with the DDR SDRAM and DQS. This type of skew causes sampling jitter, which also reduces the data valid window. The DDR SDRAM specifies the phase relationship between the clock associated the memory and the DQS generated from the controller. It will be appreciated by one of ordinary skill in the art that designers typically delay DQS relative to data on a write operation in order to comply with timing constrains of the DDR SDRAM. However, this approach increases the likelihood of violating the phase constraints between DQS domain and the clock domain. Therefore, there is a need for a system to support DDR SDRAM write operations using a controller that shifts the data relative to DQS while complying with the timing constraints between the DQS and clock domain.

SUMMARY OF THE INVENTION

In accordance with the invention, a computer system for writing data to a memory buffer comprises a processor, a memory buffer; and a memory controller. The memory controller comprises a system clock, which is generated by the memory controller. A first register captures the lower data word based on the rising edge of the system clock. A second register, coupled to the first register, captures the output of the first register based on the rising edge of the system clock. A third register, captures the upper data word based on the falling edge of the system clock. A forth register, coupled to the third register, captures the output of the third register based on the falling edge of the system clock. A first multiplexer is coupled to a forth register and a second register. A delay element, coupled to the system clock and a first multiplexer, adjusts the phase of the system clock, which shifts the data relative to the data strobe. A second multiplexer, coupled to the system clock, generates a data strobe.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the embodiments of the invention, examples of which are illustrated in the accompanying drawings. Wherever possible, the same reference numbers will be used throughout the drawings to refer to the same or like parts.

To facilitate an understanding of the embodiments of the invention, the general architecture and operation of a controller will initially be described. The specific architecture and operation of the various embodiments of the invention will then be described with respect to the general architecture.

Figure 1:
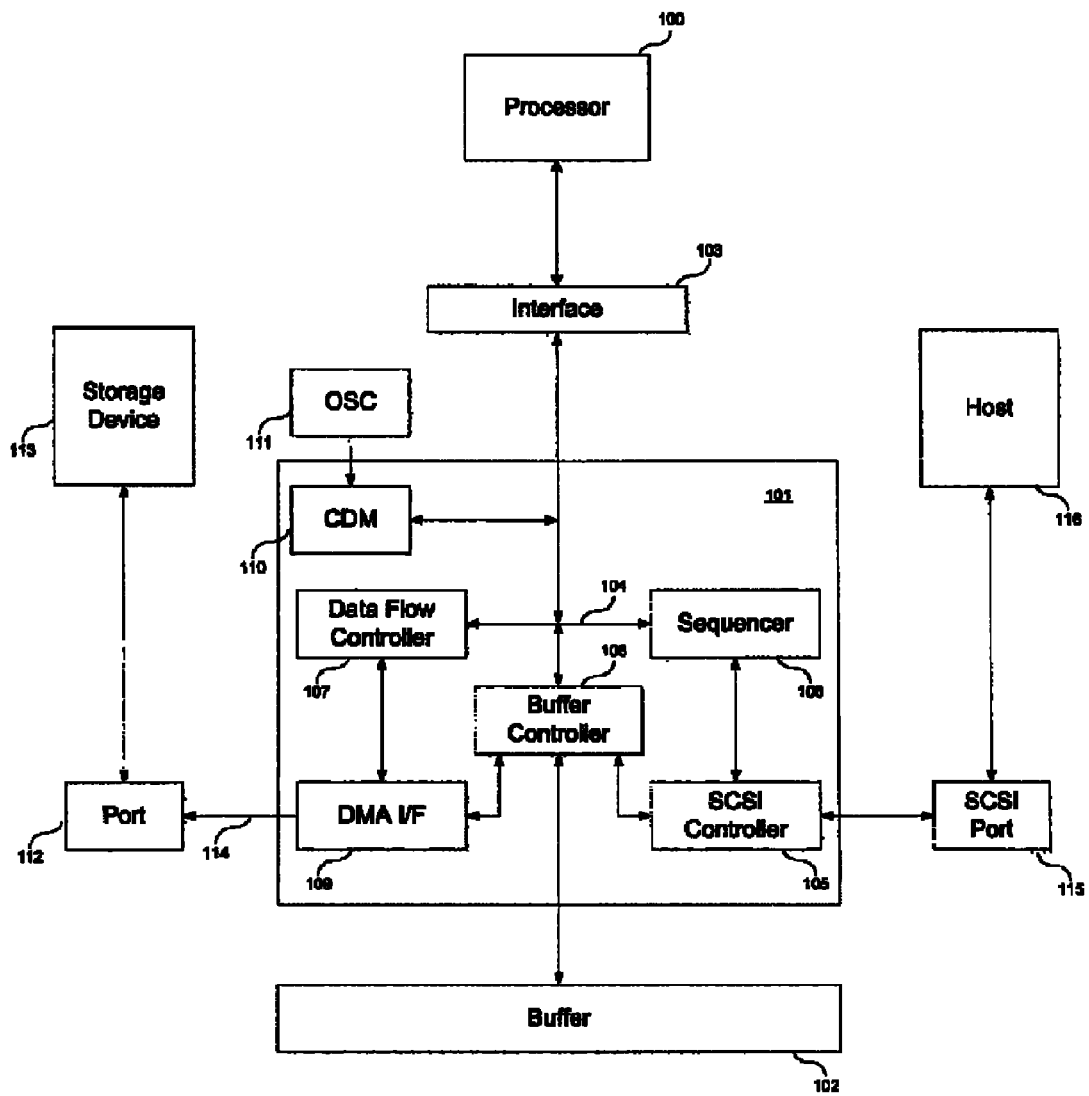
FIG. 1 illustrates a block diagram of an exemplary streaming storage drive system according to an embodiment of the present invention.

The system of FIG. 1 is an example of a streaming storage drive system, that may be included in or coupled to a computer system. The host computer 116 and the storage device 113 communicate via SCSI port 115, which is connected to a data bus (not shown). The data bus, for example, may be a bus in accordance with the Small Computer System Interface (SCSI) specification or another communication bus known in the art that can be used to transfer data between the storage device 113 and the host 116. In an alternative embodiment (not shown), the storage device 113 is an external storage device, which is connected to the host 116 via a data bus.

As illustrated in FIG. 1, an exemplary system includes a controller 101, which is coupled to SCSI port 115, port 112, buffer memory 102, and processor 100. Interface 103 serves to couple processor bus 104 to processor 100. A read only memory ("ROM") omitted from the drawing may be used to store firmware code executed by processor 100. Port 112 couples controller 101 to storage device 113.

In one embodiment, controller 101 can be an integrated circuit (IC), comprised of various functional modules, facilitating writing and reading of data stored on the storage device 113. Interface 103 couples processor 100 to controller 101, providing an interface to transfer data, address, timing and control information. Buffer memory 102 may be, for example, SDR SDRAM, DDR SDRAM, DDR2 SDRAM, Mobile DRAM, Low Power ("LP") DRAM or the like.

Data flow controller 107 is connected via processor bus 104 to buffer controller 108. A DMA interface 109 is connected via microprocessor bus 104 and to port 112. SCSI controller 105 includes programmable registers and state machine sequencers that interface with SCSI port 115.

Sequencer 106 manages transfers from the storage device 113 to the controller 101 and accepts commands from the host 116. Sequencer 106 supports firmware interrupts that enable processor 100 to initiate an operation within sequencer 106 without stopping sequencer operation. The sequencer 106 also supports hardware interrupts that comes directly from SCSI controller 105.

Buffer controller 108 connects to buffer memory 102, DMA I/F 109, and a SCSI channel of SCSI controller 105 via processor bus 104. Buffer controller 108 regulates data movement to and from the buffer memory 102.

To read data from storage device 113, a host system 116 sends a read command to controller 101, which stores the read command in buffer memory 102. Processor 100 then reads the command out of buffer memory 102 and initializes the various functional blocks of controller 101. Data is read from device 113 and passed through DMA I/F 109 to buffer controller 108.

Figure 3:
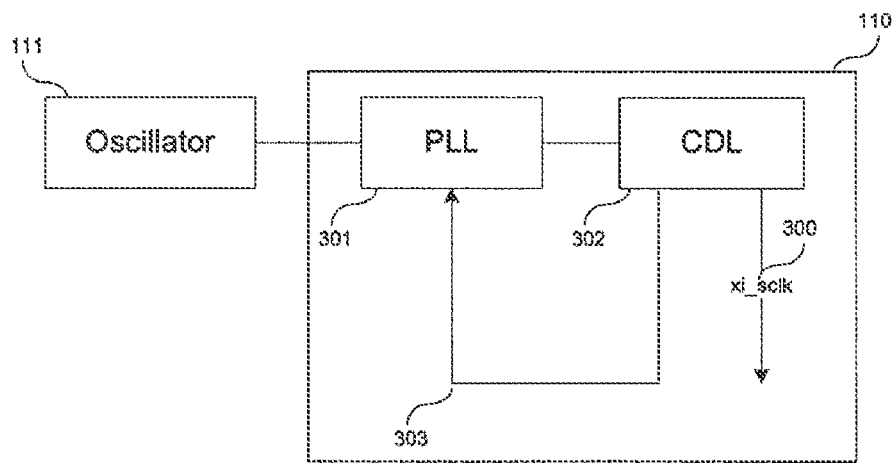
FIG. 3 illustrates a block diagram of an exemplary clock distribution module according to an embodiment of the present invention.

Controller 101 includes a clock distribution module ("CDM") 110 that generates a clock signal, according to one aspect of the present invention. FIG. 3 shows a block diagram of CDM 110 with an oscillator 111 coupled to phase locked loop ("PLL") 302 that includes an electronic circuit that controls oscillator 111 such that oscillator 111 maintains a constant phase angle with respect to the input signal. PLL 302 is coupled to clock distribution logic ("CDL") 302 that generates a system clock 300.

Figure 2:
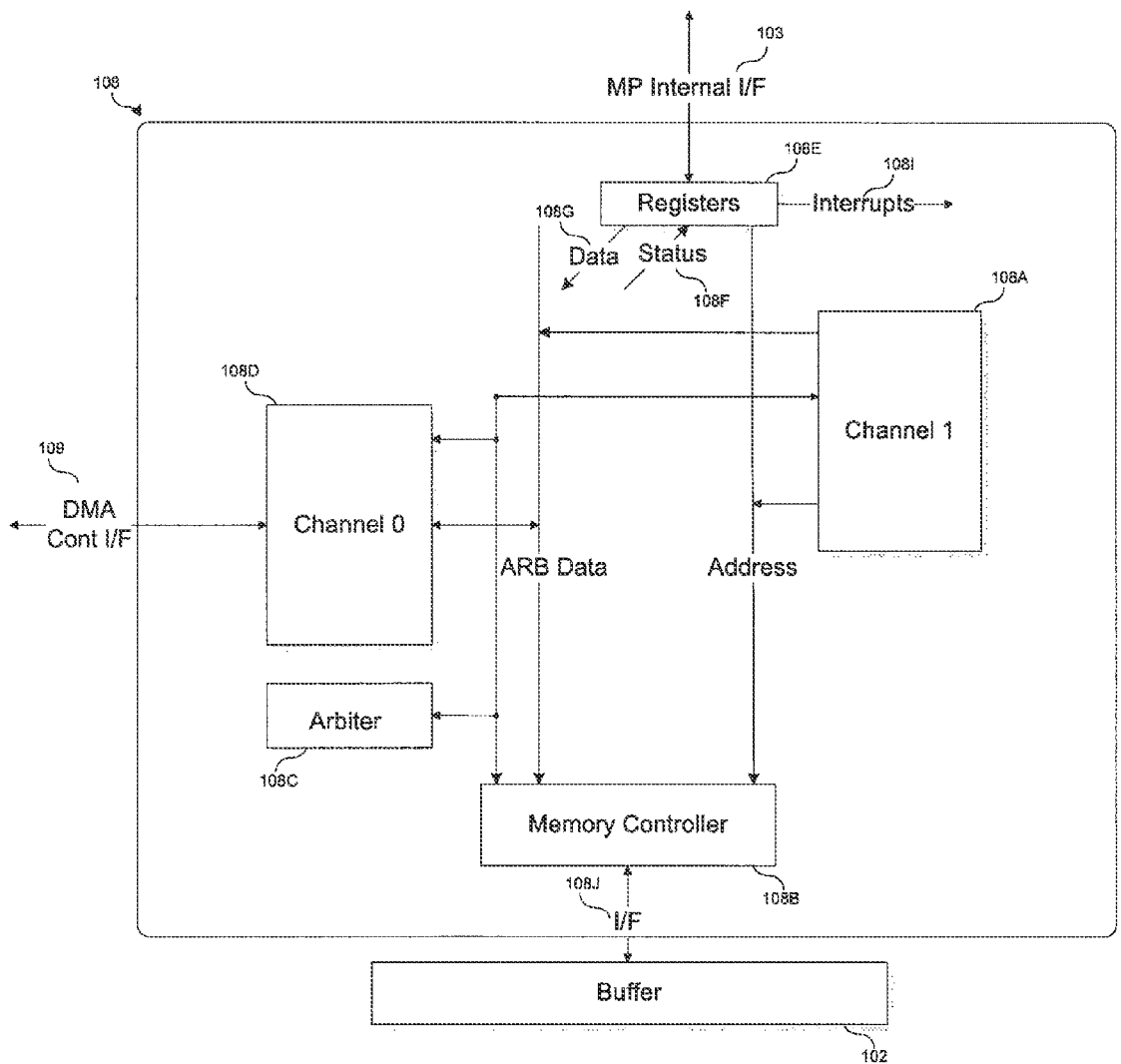
FIG. 2 illustrates a block diagram of an exemplary buffer controller according to an embodiment of the present invention.

FIG. 2 illustrates a block diagram of an exemplary buffer controller 108 with channel 1 108A and channel 0 108D for moving data to and from buffer 102. As shown in FIG. 2, buffer controller 108 includes registers 108E and an arbiter 108C. Arbiter 108C arbitrates between a plurality of channels in buffer controller 108. Register 108E is coupled to interface 103 via processor bus 104, enabling the processor 100 and buffer controller 108 to communicate. Data 108G and status 108F are moved in and out of the register 108E based on commands from the microprocessor via the microprocessor internal interface 103. Buffer controller 108 also includes a multi-channel memory controller 108B that provides an interface to buffer memory 102.

FIG. 3 illustrates a block diagram of an exemplary clock distribution module 110. The clock distribution module 110 generates system clock xi_sclk 300, which drives buffer 102 and memory controller 108B. The clock distribution module 110 uses an oscillator 111 as a reference clock, which provides the input to phase lock loop ("PLL") 301. The PLL 301 maintains a constant phase relationship between the reference clock, provided by the oscillator 111, and the outputs of the clock distribution logic 302. One of the outputs of the clock distribution logic 302 is used to provide feedback to the PLL 301. The PLL 301 compares the oscillator 111 output with the clock distribution logic output 303 and adjusts the PLL 301 output in order to maintain a constant phase relationship between the oscillator 111 output and clock distribution logic output 303. Although FIG. 3 depicts two outputs from clock distribution logic 302, it will be appreciated by one of ordinary skill in the art that clock distribution logic 302 can produce a plurality of balanced clocks with similar phase characteristics.

Figure 4:
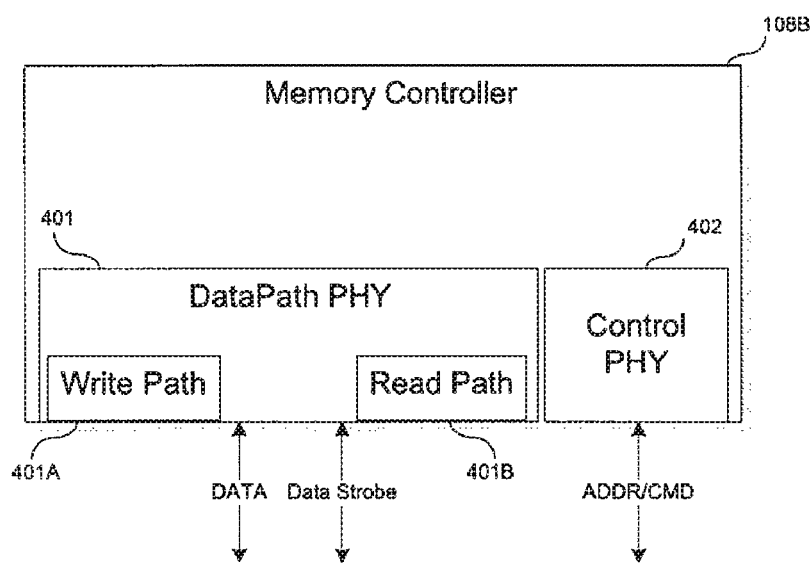
FIG. 4 illustrates a block diagram of an exemplary memory controller according to an embodiment of the present invention.

FIG. 4 illustrates a block diagram of an exemplary memory controller 108B. The memory controller 108B includes a data path physical interface ("PHY") 401 and a control PHY 402. The data path PHY sends and receives electrical signals from the memory controller to and from the buffer 102. The data path PHY 401 includes a write path PHY 401A and a read path PHY 401B. Both the write path PHY 401A and read path PHY 401B manage the skew between data domain and clock domain signals in order to ensure that the transmitted data can be properly interpreted by the buffer 102.

Figure 5:
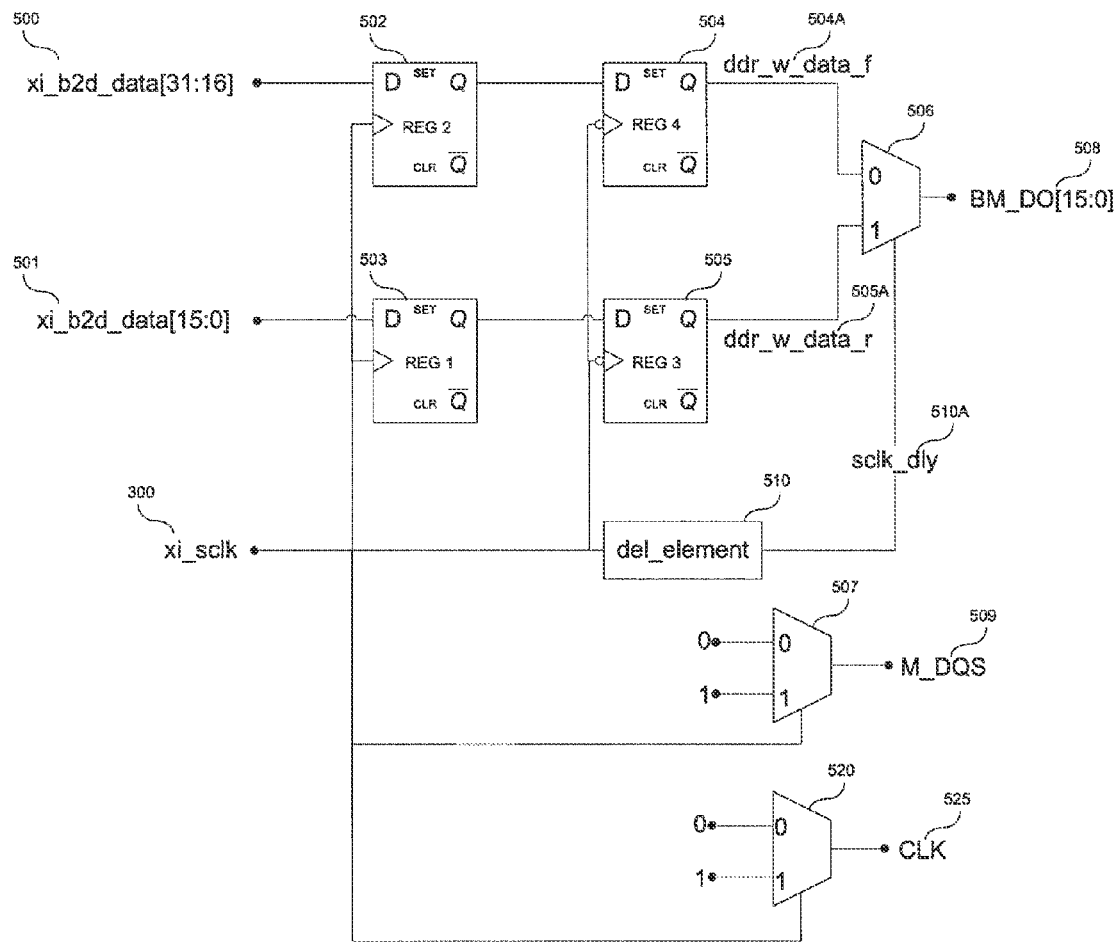
FIG. 5 illustrates a conceptual logic diagram of an exemplary write operation according to an embodiment of the present invention.

In at least one embodiment of the invention, depicted in FIG. 5, a DDR write operation is conducted by shifting the data words 500 and 501 relative to the data strobe M_DQS 509, using a programmable delay element 510. To ensure optimal data transmission integrity from the controller to the buffer 102, the data output 508 and the data strobe 509 must be properly aligned at the input to the buffer. Data written to the buffer 102 is delayed with respect to the clock 300 and strobe 509 to ensure optimal sampling as discussed below.

In FIG. 5, a data bus serves as the input to registers 502 and 503. For a single write access, two data words are provided to the data path PHY, combined and then written to the DRAM device in one internal access. In FIG. 5, xi_b2d_data[31:16] 500 and xi_b2d_data[15:0] 501 represent the upper data word and lower data word, respectively. On the rising edge of xi_sclk 300, the lower data word 501 is latched from the D input of register 1 503 to the output Q of register 1 503. Similarly, the value at the output Q of register 1 503 prior to the rising edge of xi_sclk 300 for a given clock cycle, is latched from the input D of register 3 505 to the output Q of register 3 505 during the rising edge of xi_sclk 300. When the corresponding falling edge of xi_sclk 300 occurs during a given clock cycle, the upper data word 500 is latched from the D input of register 2 502 to the output Q of register 2 502. Similarly, the value at the output Q of register 2 502 prior to the falling edge xi_sclk 300 for a given clock cycle, is latched from the input D of register 4 504 to the output Q of register 4 504 during the falling edge of xi_sclk 300.

BM_DO[15:0] 508 (data output) is generated by multiplexing the output of register 3 505 and register 4 504 and using the output of a delay element 510 to select which input is sampled. The sampled data output 508 is then transmitted to the buffer 102, along with M_DQS 509.

The delay element 510 phase shifts xi_sclk 300 in a manner that aligns the rising and falling edges of sclk_dly 510A with the center data valid windows of ddr_w_data_f 504A and ddr_w_data_r 505A. On the rising edge of sclk_dly 510A, multiplexer 506 samples ddr_w_data_r 505A and sends it to the output BM_DQ[15:0] 508. Similarly, on the falling edge of sclk_dly 510A, multiplexer 506 samples ddr_w_data_f 504A and sends it to the output BM_DQ[15:0] 508. Multiplexer 506 and sclk_dly 510A, driving the select control for multiplexer 506A, provide double data rate sampled data for data write operations.

At the buffer 102, the data strobe M_DQS 509 and CLK 525 arrive phase-shifted with respect to the data output 508. The rising and falling edges of the data strobe M_DQS 509 arrive at the buffer 102 centered with respect to the data valid window of the data output 508. The buffer then uses the data strobe 509 to sample the data output 508. By using the delay element 510 to generate the data output 508, the data output 508 is delayed with respect to the data strobe 509 in a manner that maintains the timing relationship between the signals to enable adequate data transmission integrity based on the applicable DRAM component specification.

Figure 6:
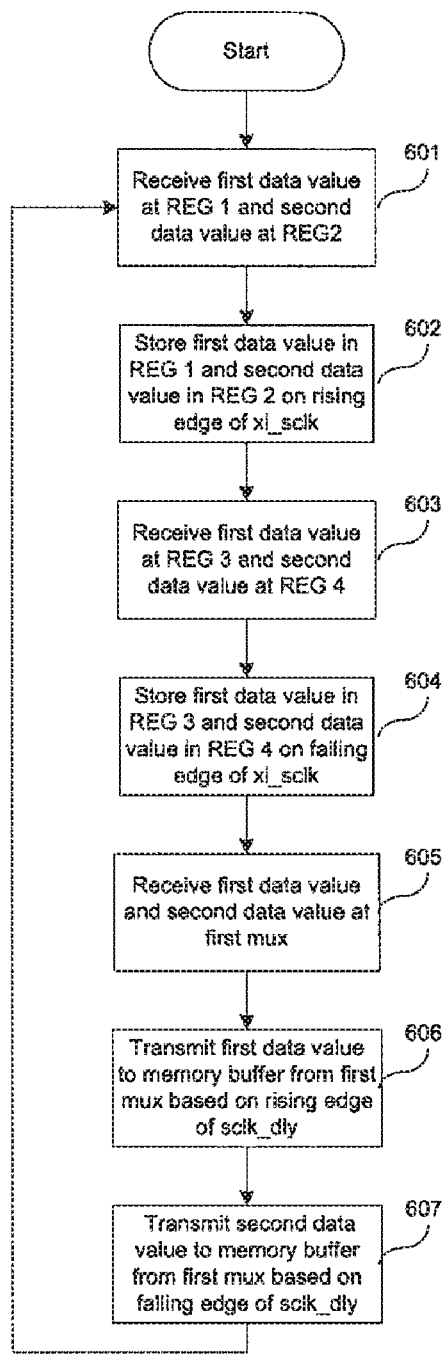
FIG. 6 illustrates a flowchart of an exemplary method for writing data to a memory buffer.

FIG. 6 illustrates an exemplary method for writing data to a memory buffer. It will be readily appreciated by one having ordinary skill in the art that the illustrated procedure can be altered to delete steps, move steps, or further include additional steps. In step 601, a first data value and a second data value are provided to the memory controller and are received at a first register and a second register, respectively. In step 602, the first data value and the second data value are stored in the first register and the second register, respectively, using a first clock edge of a system clock received by the memory controller. The first clock edge of the system clock provides a strobe to the first and second registers simultaneously, which causes the inputs of the first and second registers to be copied to the their respective outputs. Storing the first data value in a first register provides the first data value at the output of the first register. Similarly, storing the second data value in the second register provides the second data value at the output of the second register.

In step 603, a third register, connected to the output of the first register, receives the first data value. A fourth register, connected to the output of the second register, receives the second data value. In step 604, using a second edge of the system clock received by the memory controller, the first data value and the second data value are stored in the third register and the forth register, respectively. Here, the first edge of the system clock and the second edge of the system clock occur sequentially. In a manner similar to that in step 602, storing the first data value in the third register provides the first data value at the output of the third register. Similarly, storing the second data value in the forth register provides the second data value at the output of the forth register.

In step 605, a first multiplexer, having a first input connected to the output of the third register and a second input connected to the output of the forth register, receives the first data value and the second data value. In step 606, the first multiplexer outputs the first data value to a memory buffer coincident with a first edge of a phase-delayed system clock. The phase-delayed system clock is produced by a programmable delay element, which receives the system clock and generates a phase-delayed version of the system clock. The phase-delay system clock is then used to produce a double data rate output from the memory controller during a data write operation. In the following step 607, the first multiplexer outputs the second data value to a memory buffer coincident with a second edge of a phase-delayed system clock. Here, the first edge of the phase-delayed system clock and the second edge of the phase-delayed system clock occur sequentially. This process returns to step 601 until the memory buffer completes the transmission of all data values for a specific transaction based on instructions from the processor, digital signal process, co-processor or similar device.

Figure 7:
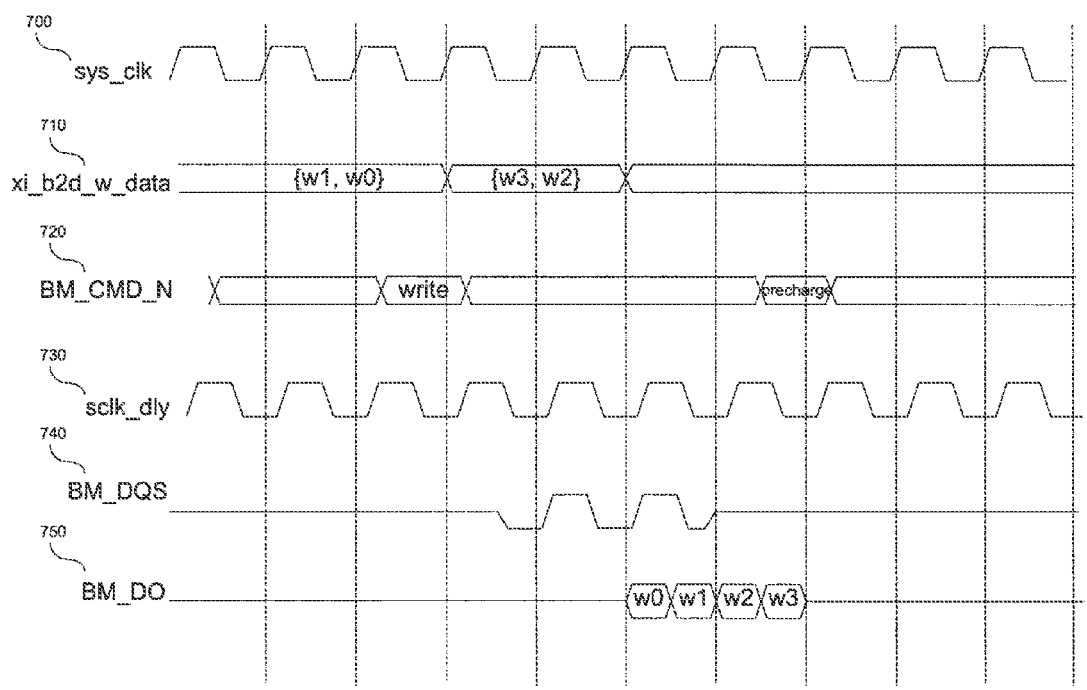
FIG. 7 illustrates a timing diagram of an exemplary embodiment consistent with the present invention.

FIG. 7 illustrates a timing diagram of an exemplary embodiment consistent with the present invention. Two pairs of data words, represented by w0, w1, w2, w3 on signal xi_b2d_w_data 710 are stored in registers based on the rising edge and falling edge of a system clock. Here, lower data word w0 and upper data word w1 are stored in register A and register B. Similarly, lower data word w2 and upper data word w3 are stored in register C and register D. A write command is received by the memory controller as illustrated by signal BM_CMD_N 720. The write command causes data strobe BM_DQS 740 to transition from a logical low to a logical high. Data present on xi_b2d_w_data 710 is sampled using sclk_dly 730. A delay element generates sclk_dly 730 to generate output signal BM_DQ 750 using a multiplexer. The rising edge of data stobe BM_DQS 740 occurs at the center of the data valid window of BM_DQ 750 in order to comply with the timing requirements of the memory buffer. Data BM_DQ 750 and data strobe BM_DQS 740 are transferred to memory buffer to complete the write operation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A storage drive comprising:
   a processor;
   a buffer, the buffer comprising
      one of a Double Data Rate ("DDR") synchronous dynamic random addressable memory ("SDRAM"), Single Data Rate ("SDR") SDRAM, Mobile DRAM, or Low Power ("LP") DRAM;
   a first controller configured to transfer commands from the processor to the buffer, wherein the first controller includes a second controller comprising
      a first register configured to capture a lower data word based on a first clock edge of a system clock, and
      a second register configured to capture an upper data word based on a second clock edge of the system clock, wherein the first clock edge and the second clock edge occur sequentially;
   a multiplexer having at least two inputs for receiving an output of the first register and the second register and transferring the output of the first register and the second register to the buffer based on an output of a delay element, wherein the delay element receives a system clock and outputs a delayed system clock based on user-defined programmable settings;
   a data strobe for sampling data received by the buffer, wherein the data strobe is generated based on the system clock, and wherein sampling the data received at the buffer includes centering a rising edge of the data strobe with the center of a data valid window for the data received at the buffer; and
   a memory clock received by the buffer, the memory clock generated based on the system clock, wherein the memory clock and the data strobe are phase coherent.

2. A storage drive system comprising:
   a processor;
   a controller configured to transfer commands from the processor to a buffer, wherein the controller includes
      a first register to capture a lower data word based on a first clock edge of a system clock, and
      a second register to capture an upper data word based on a second clock edge of the system clock, wherein the first clock edge and the second clock edge occur sequentially;
   a multiplexer for transferring an output of the first register and the second register to the buffer based on an output of a user-programmable delay element; and
   a data strobe for sampling the data received by the buffer.

3. The system of claim 2, wherein sampling the data received by the buffer includes centering the rising edge of the data strobe with the center of a data valid window for the data received by the buffer.

4. The system of claim 2, further comprising:
   a memory clock received by the buffer, the memory clock generated based on the system clock, wherein the memory clock and the data strobe are phase coherent.

5. The system of claim 2, wherein the user-programmable delay element comprises a digital delay lock loop configured to adjust, based on user-defined programmable settings, the phase of an input clock over a fixed range centered with respect to the phase of the input clock.

6. The system of claim 2, wherein the data strobe is generated by a second multiplexer having (i) at least two data inputs set to opposite logical values and (ii) one control input coupled to the system clock.

7. The system of claim 2, wherein the memory clock is generated by a third multiplexer having (i) at least two data inputs set to opposite logical values and (ii) one control input coupled to the system clock.

8. An apparatus for outputting information to a buffer at twice the received data rate, the apparatus comprising:
   a circuit configured to
      receive at least a first data word and a second data word by at least two registers, the at least two registers configured to store the first data word and the second data word based on a system clock;
      phase shift the system clock by a delay element, the delay element configured to delay the system clock based on user defined programmable settings to produce a delayed system clock;
      output the first data word and the second data word from a first multiplexer, the first multiplexer configured to output data during sequential clock edges of the delayed system clock; and
      output (i) a data strobe from a second multiplexer and (ii) a memory clock from a third multiplexer, wherein the data strobe and the memory clock are (i) phase coherent with the system clock and (ii) center aligned with an output data valid window of the first multiplexer.

9. The apparatus of claim 8, wherein the first data word and the second data word respectively comprise at least a lower data word and an upper data word.

10. The apparatus of claim 8, wherein the at least two registers configured to store the first data word and the second data word based on a system clock comprise at least a first data register and a second data register configured to respectively store the lower data word and the upper data word based on a rising edge or a falling edge of the system clock.

11. The apparatus of claim 8, wherein the delay element comprises a digital delay lock loop to adjust the phase of an input clock over a fixed range.

12. A method for writing information to a buffer, the method comprising:
   based on a system clock, (i) storing a first data word in a first register and (ii) storing a second data word in a second register;

delaying the system clock based on user defined programmable settings to produce a delayed system clock;

outputting the first data word and the second data word from a first multiplexer configured to output data during sequential clock edges of the delayed system clock; and outputting (i) a data strobe from a second multiplexer and (ii) a memory clock from a third multiplexer, wherein the data strobe and the memory clock are (i) phase coherent with the system clock and (ii) center aligned with an output data valid window of the first multiplexer.

13. The method of claim 12, wherein storing the first data word and the second data word based on the system clock comprises the first register configured to store the first data word during one of:

a rising system clock edge; or a falling system clock edge; and the second register configured to store the second data word during an opposite system clock edge compared to the system clock edge used to store the first data word.

14. The method of claim 12, wherein delaying the system clock comprises:

adjusting the phase of an input clock over a fixed range based on user-defined programmable settings by selecting one of a plurality of phase settings on a digital delay lock loop during a system initialization period; and selecting one of the plurality of phase settings that aligns a rising edge of the delayed system clock with the center of an output data valid window of the first multiplexer.

15. The method of claim 12, wherein outputting the first data word and the second data word from a first multiplexer configured to output data during sequential clock edges of the delayed system clock comprises:

receiving the first data word at a first data input of the first multiplexer;

receiving the second data word at a second data input of the first multiplexer;

receiving the delayed system clock at a control input of the first multiplexer;

outputting the first data word during a falling edge of the delayed system clock or a rising edge of the delayed system clock; and outputting the second data word during the opposite edge of the delayed system clock used to output the first data word.

16. The method of claim 12, wherein outputting a data strobe from a second multiplexer and outputting a memory clock from a third multiplexer comprises:

having a second multiplexer with at least two data inputs set to opposite logical values and a control input coupled to the system clock to generate the data strobe;

having a third multiplexer with at least two data inputs set to opposite logical values and a control input coupled to the system clock to generate the memory clock; and having the data strobe and the memory clock phase coherent with the system clock and center aligned with an output data valid window of the first multiplexer.

* * * * *